UNITED STATES PATENT OFFICE.

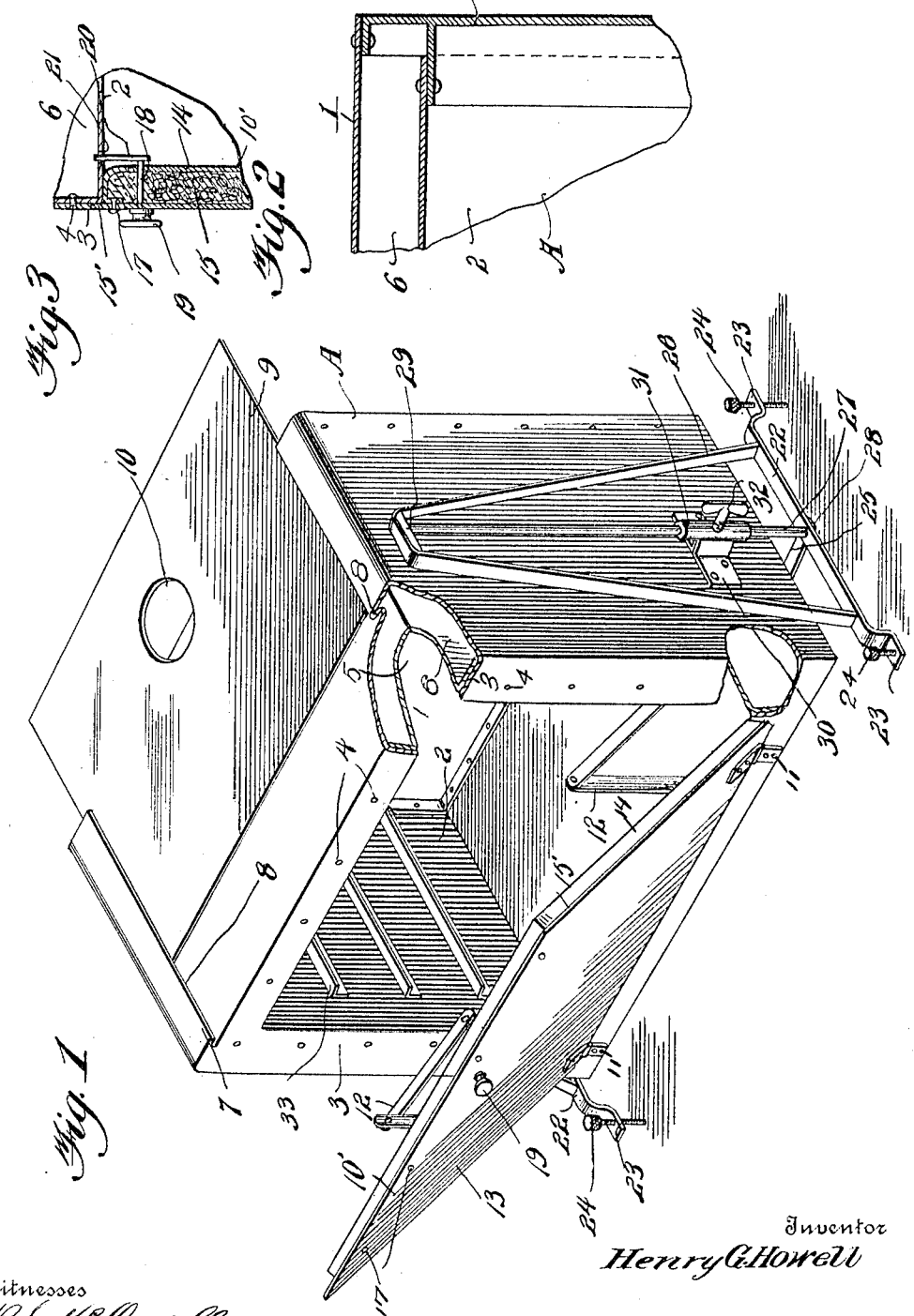

HENRY G. HOWELL, OF ANDERSON, SOUTH CAROLINA.

OVEN.

1,072,231.  Specification of Letters Patent.  Patented Sept. 2, 1913.

Application filed August 2, 1911. Serial No. 641,886.

*To all whom it may concern:*

Be it known that I, HENRY G. HOWELL, a citizen of the United States, residing at Anderson, in the county of Anderson and State of South Carolina, have invented new and useful Improvements in Ovens, of which the following is a specification.

The present invention relates to improvements in ovens of that type adapted particularly to be attached to or used in conjunction with open grates and like fire places.

In the present instance, it is my purpose to provide a portable oven which will embrace the desired features of simplicity, convenience and efficiency, and which may be adjusted upon its supports to assume the desired position with respect to the grate.

Furthermore, it is my purpose to provide an oven having double top, bottom and side walls, while the rear of the oven is in the form of a single wall.

With the above-recited objects and others of a similar nature in view, the invention consists in the construction, combination and arrangement of parts, set forth in and falling within the scope of the appended claims.

In the accompanying drawing:—Figure 1 is a perspective view of an oven embodying my invention. Fig. 2 is a vertical sectional view, taken through a portion of the top and side wall of the oven. Fig. 3 is a detail sectional view of a portion of the front of the oven, showing the door in closed position.

Referring to the accompanying drawing in detail, the letter A designates the body of the oven as an entirety, said body portion comprising an outer casing 1 and an inner casing 2 spaced apart therefrom, the walls of the outer casing at the front having flanges turned inwardly at 3 and connected through rivets 4 or the like with the adjacent out turned edge of the inner casing to close the space between the inner and outer casings at the front of the oven. At the rear of the oven, I provide a back wall 5 for the casings, which, being attached to the back of the outer casing covers both the back of the outer casing and the back of the inner casing. It will be seen that by such a construction of the oven as just described, I provide a space 6 formed between the walls of the two casings, the air in said space being heated and thereby assists in retaining the temperature of the oven at the desired degree.

The top of the casing 1 is formed with the inwardly turned flanges 7 forming guideways 8 for the reception of the sliding lid 9, the latter having an aperture 10 therein by means of which the lid may be moved outward to extend over an adjacent grate or drawn inward to lie directly over the oven top. This lid when extended may be used for frying or for supporting receptacles thereon which contain food to be heated or cooked. The front of the oven is provided with a door 10' hinged to the bottom of the front as at 11, said door when open being supported by the hinged supporting members 12 connected to the inner wall of the oven and to the door, as shown in Fig. 1. This door is formed with an outer wall 13 and an inner wall 14 spaced apart therefrom, the space between the two walls of the door being provided with a filling 15 of asbestos or other fireproof material. The outer face or wall 13 of the door is larger than the wall 14 so that the flange 15' of single thickness extends around the door, the inner wall being fastened by rivets or the like 17 to the outer wall.

The numeral 18 designates a locking bolt rotatable by means of the thumb nut 19, said bolt projecting through the door and carrying a latch member 20 adapted to lock in a slot or groove 21 in the top wall of the inner chamber.

In order to adjustably support the oven, I provide a frame comprising a pair of horizontally disposed brace bars 22 having downturned angular end portions 23, through which pass the vertical adjusting screws 24. The brace bars are connected by means of a cross bar 25, while extending vertically upward from each brace bar is an inverted approximately U-shaped leg 26. Extending vertically between the members of each U-shaped leg is a rod 27, the lower end of each rod being connected as at 28 to the adjacent horizontal or brace bar, while the top end is secured as at 29 to the adjacent portion of the top of the U-shaped leg. Connected to each adjacent side wall of the oven casing is a bracket 30 carrying a sleeve 31, adapted to loosely receive the adjacent vertical rod 27, while 32 indicates a set screw by means of which the sleeve may be stationarily and adjustably held upon the rod.

From the construction just described, it will be seen that the oven is provided with brackets slidable upon the vertical rods 27 supported by their frames, so that the body of the oven may be raised and lowered to any desired position of adjustment on the vertical rods. Within the oven and suitably spaced apart are the horizontally disposed supporting strips 33 for the support of the usual oven shelves.

From the above description, taken in connection with the accompanying drawing, the construction and manner of using my improved oven will be readily apparent. It will be noted that the oven may be moved to a position adjacent to the open grate, or in direct contact therewith. Furthermore, it will be seen that the supporting frame for the oven may be properly leveled at the base by means of the adjusting screws 24 while the oven itself may be adjusted vertically upon its supporting rods by the thumb screws and sleeve brackets, heretofore mentioned.

I claim:—

1. An oven comprising a body portion, means for adjustably supporting said oven, said means comprising a base frame, a plurality of U-shaped legs projecting upwardly from the base frame at the opposite sides of the oven, rods extending between the U-shaped legs and the base frame, brackets secured to the oven, a sleeve on each bracket designed to receive the respective rod, and means carried by the base frame for adjusting the latter relatively to the floor.

2. An oven comprising a body portion, means for adjustably supporting said oven, said means comprising a base frame, a plurality of U-shaped legs carried by the frame, rods extending between the U-shaped legs and the base frame, means carried by the oven for adjustably connecting the latter to the rods, and means carried by the base frame for adjusting the latter relatively to the floor.

In testimony whereof I affix my signature in presence of two witnesses.

HENRY G. HOWELL.

Witnesses:
C. J. DELAMPS,
A. B. SULLIVAN.

Copies of this patent may be obtained for five cents each, by addressing the "Commissioner of Patents, Washington, D. C."